United States Patent
Gargash et al.

(10) Patent No.: US 8,700,926 B2
(45) Date of Patent: Apr. 15, 2014

(54) SYSTEM AND METHOD OF TUNING A DYNAMIC CLOCK AND VOLTAGE SWITCHING ALGORITHM BASED ON WORKLOAD REQUESTS

(75) Inventors: Norman S. Gargash, San Diego, CA (US); Brian J. Salsbery, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 12/846,331

(22) Filed: Jul. 29, 2010

(65) Prior Publication Data

US 2011/0173463 A1    Jul. 14, 2011

Related U.S. Application Data

(60) Provisional application No. 61/294,026, filed on Jan. 11, 2010.

(51) Int. Cl.
*G06F 1/00* (2006.01)
*G06F 9/00* (2006.01)
*G06F 9/46* (2006.01)

(52) U.S. Cl.
USPC ............................ 713/300; 713/100; 718/104

(58) Field of Classification Search
None
See application file for complete search history.

(56) References Cited

U.S. PATENT DOCUMENTS

| | | | |
|---|---|---|---|
| 4,670,837 A * | 6/1987 | Sheets ........................... | 713/501 |
| 5,692,204 A | 11/1997 | Rawson et al. | |
| 6,076,171 A | 6/2000 | Kawata | |
| 6,115,823 A * | 9/2000 | Velasco et al. ................. | 713/322 |
| 6,192,307 B1 | 2/2001 | Okamoto et al. | |
| 6,230,279 B1 | 5/2001 | Dewa et al. | |
| 6,484,041 B1 * | 11/2002 | Aho et al. ...................... | 455/574 |
| 7,065,659 B2 * | 6/2006 | Malueg et al. ................. | 713/300 |
| 7,137,017 B2 | 11/2006 | Itoh | |
| 7,484,110 B2 * | 1/2009 | Stufflebeam ................... | 713/300 |
| 7,506,189 B1 * | 3/2009 | Lee et al. ....................... | 713/322 |
| 7,539,994 B2 * | 5/2009 | McAlinden et al. ........... | 718/104 |
| 7,711,966 B2 | 5/2010 | Prabhakaran et al. | |
| 7,788,508 B1 * | 8/2010 | Salmi et al. ................... | 713/300 |
| 2004/0205757 A1 | 10/2004 | Pering | |
| 2005/0204125 A1 * | 9/2005 | Chin .............................. | 713/100 |
| 2006/0282692 A1 * | 12/2006 | Oh ................................. | 713/300 |
| 2007/0136615 A1 * | 6/2007 | Son et al. ....................... | 713/300 |

(Continued)

FOREIGN PATENT DOCUMENTS

| | | |
|---|---|---|
| EP | 0727728 A1 | 8/1996 |
| JP | H0714598 A | 1/1995 |
| JP | 09069017 | 3/1997 |
| JP | H10268963 A | 10/1998 |
| JP | 2000062501 A | 2/2000 |
| WO | WO0038038 A1 | 6/2000 |

OTHER PUBLICATIONS

International Search Report and Written Opinion—PCT/US2011/020709, International Search Authority—European Patent Office—Apr. 7, 2011.

(Continued)

*Primary Examiner* — Ji H Bae
(74) *Attorney, Agent, or Firm* — Nicholas A. Cole

(57) ABSTRACT

A method of tuning a dynamic clock and voltage switching algorithm is disclosed and may include setting a default responsivity, determining whether a workload is registering after the workload is added, assigning a unique identifier to the workload if the workload is registering, and receiving a required responsivity from the workload.

16 Claims, 8 Drawing Sheets

(56) References Cited

U.S. PATENT DOCUMENTS

| | | |
|---|---|---|
| 2008/0155092 A1* | 6/2008 | Kumar et al. ............. 709/224 |
| 2008/0301474 A1 | 12/2008 | Bussa et al. |
| 2009/0125293 A1 | 5/2009 | Lefurgy et al. |
| 2009/0193419 A1 | 7/2009 | Mcalinden et al. |
| 2009/0293061 A1* | 11/2009 | Schwinn et al. ............. 718/103 |

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

SYSTEM AND METHOD OF TUNING A DYNAMIC CLOCK AND VOLTAGE SWITCHING ALGORITHM BASED ON WORKLOAD REQUESTS

RELATED APPLICATIONS

The present application claims priority to U.S. Provisional Patent Application Ser. No. 61/294,026, entitled SYSTEM AND METHOD OF TUNING A DYNAMIC CLOCK AND VOLTAGE SWITCHING ALGORITHM BASED ON WORKLOAD REQUESTS, filed on Jan. 11, 2010, the contents of which are fully incorporated by reference

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of tuning a dynamic clock and voltage switching algorithm.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
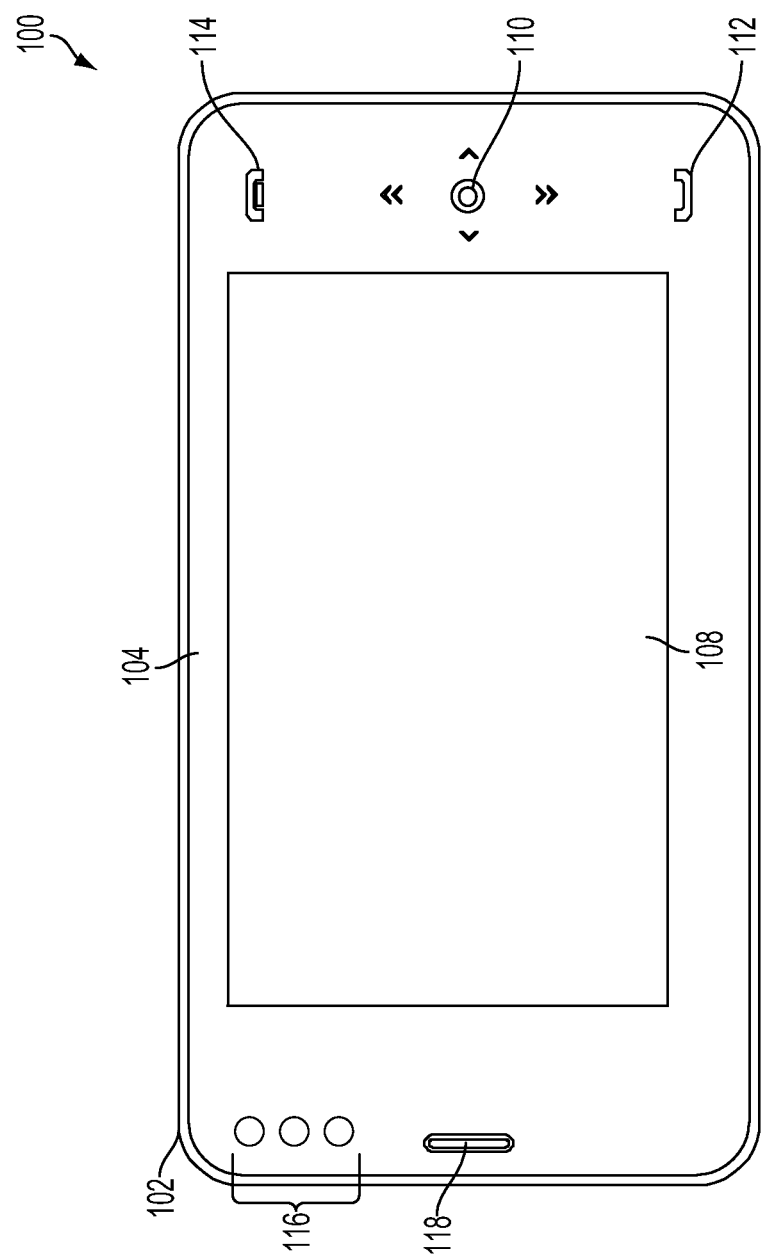
FIG. 1 is a front plan view of a first aspect of a portable computing device (PCD) in a closed position.
Figure 2:
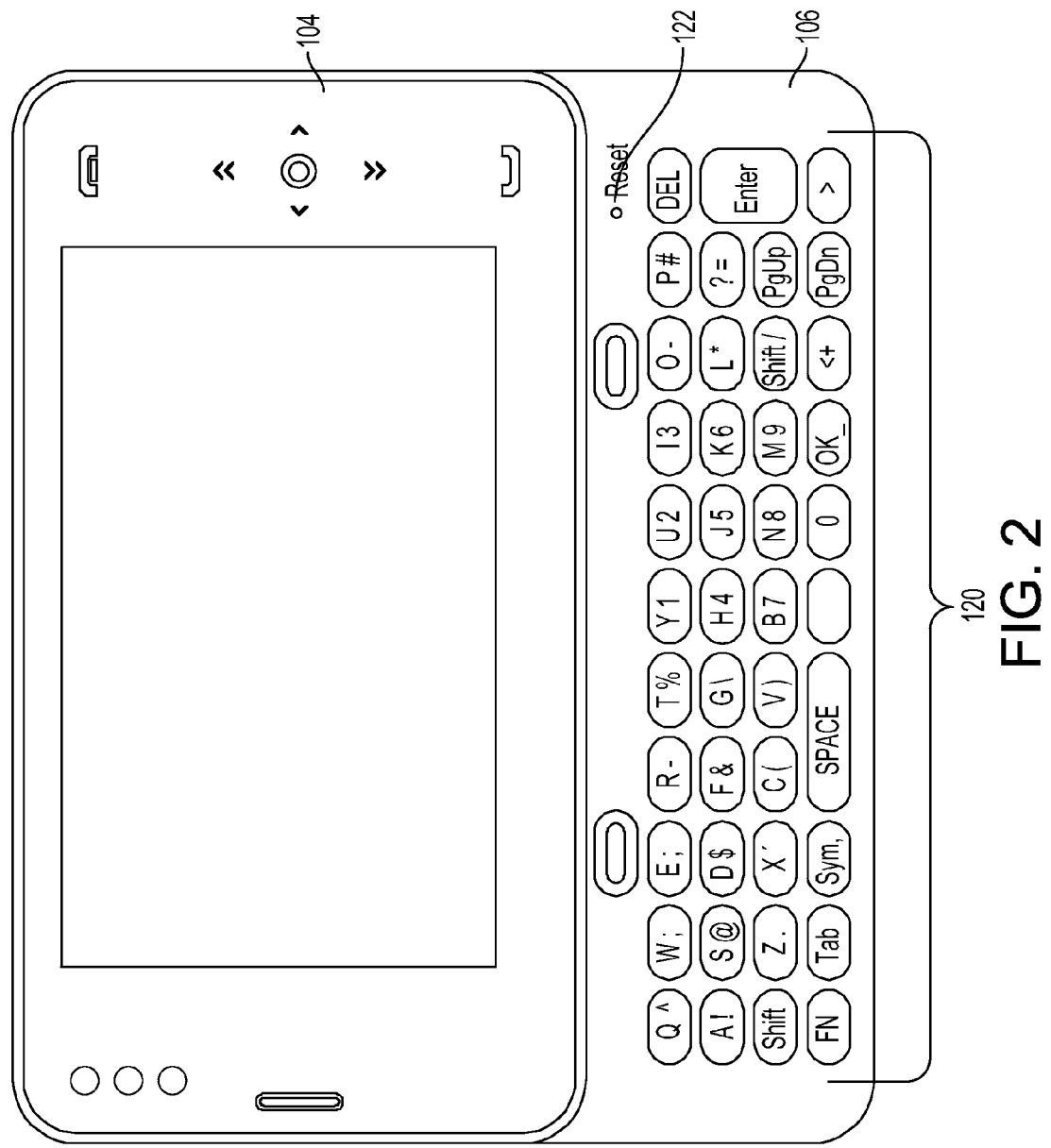
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
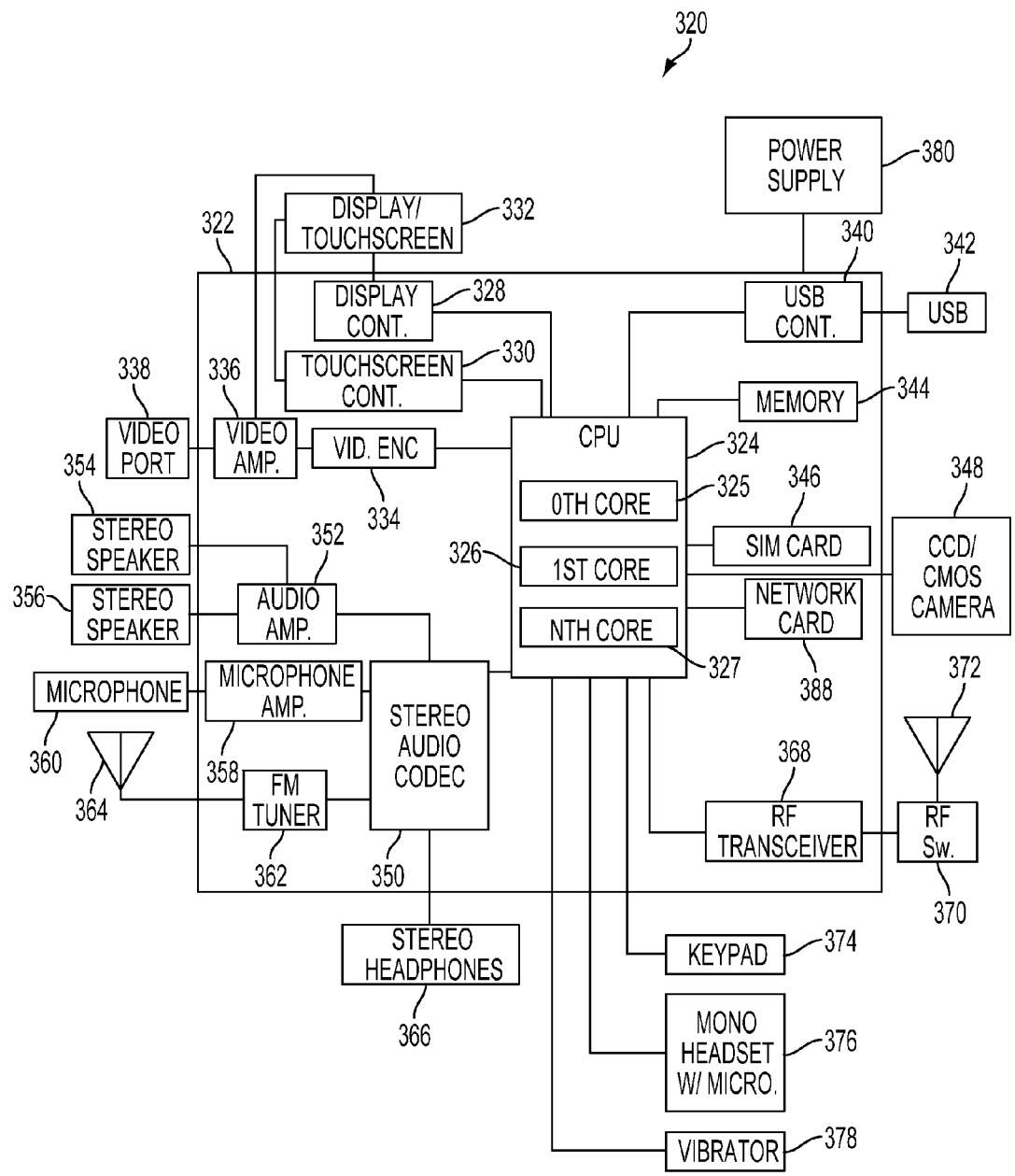
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to tune a dynamic clock and voltage switching (DCVS) algorithm based on one or more workload requirements.

Figure 4:
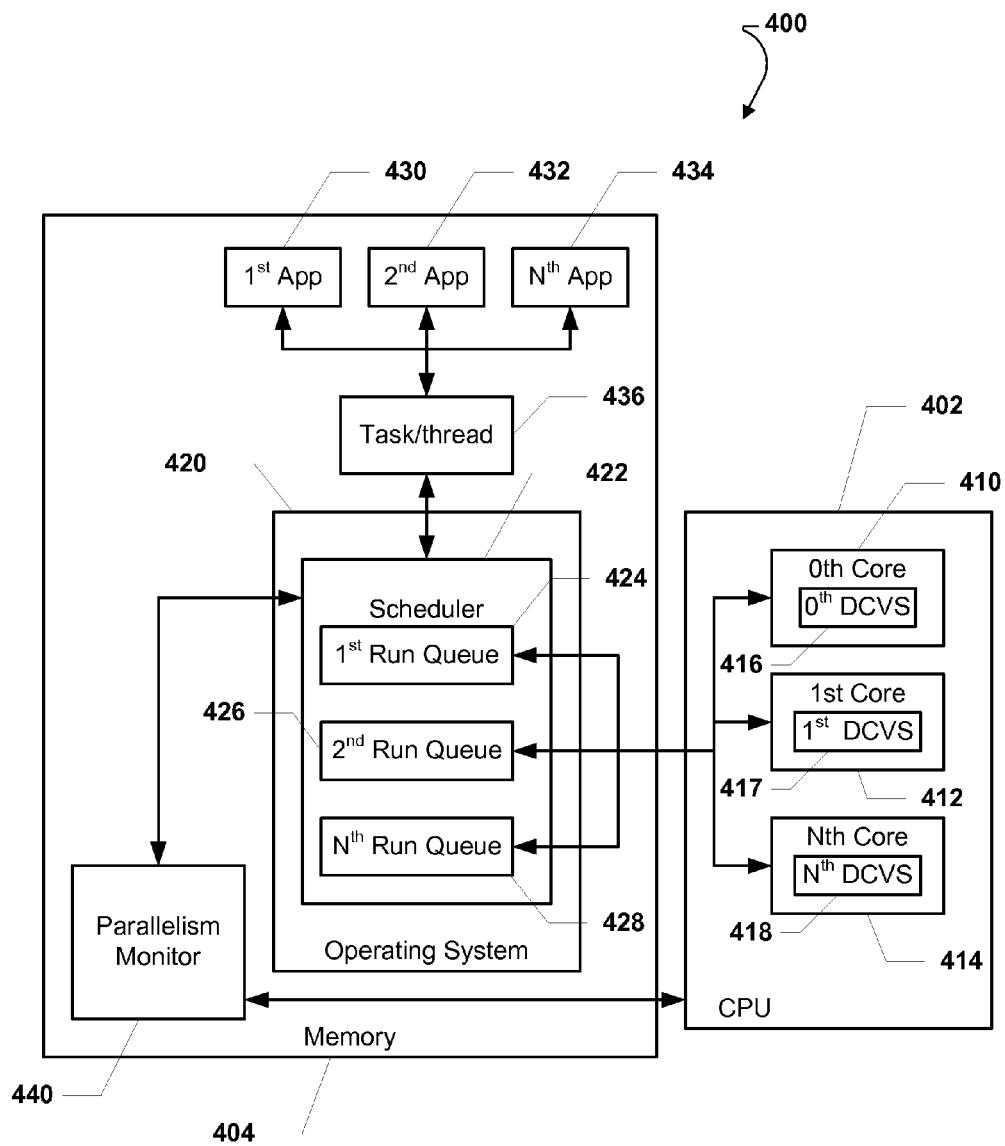
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a controller 440 stored thereon. The controller 440 may be connected to the operating system 420 and the multicore CPU 402. Specifically, the controller 440 may be connected to the scheduler 422 within the operating system 420. As described herein, the controller 440 may monitor the workload on the cores 410, 412, 414, e.g., by monitoring the scheduler 422 and the run queues 424, 426, 428. The controller 440 may tune the DCVS algorithm 416, 417, 418 operating on each core 410, 412, 414 based on the workload from each application 430, 432, 434 as described in detail below.

In a particular aspect, the controller 440 may be a software program. However, in an alternative aspect, the controller 440 may be a hardware controller that is external to the memory 404. In either case, the controller 440, the memory 404, the cores 410, 412, 414, or any combination thereof may serve as a means for executing one or more of the method steps described herein in order to tune a dynamic clock and voltage switching (DCVS) algorithm based on one or more workload requirements.

Figure 5:
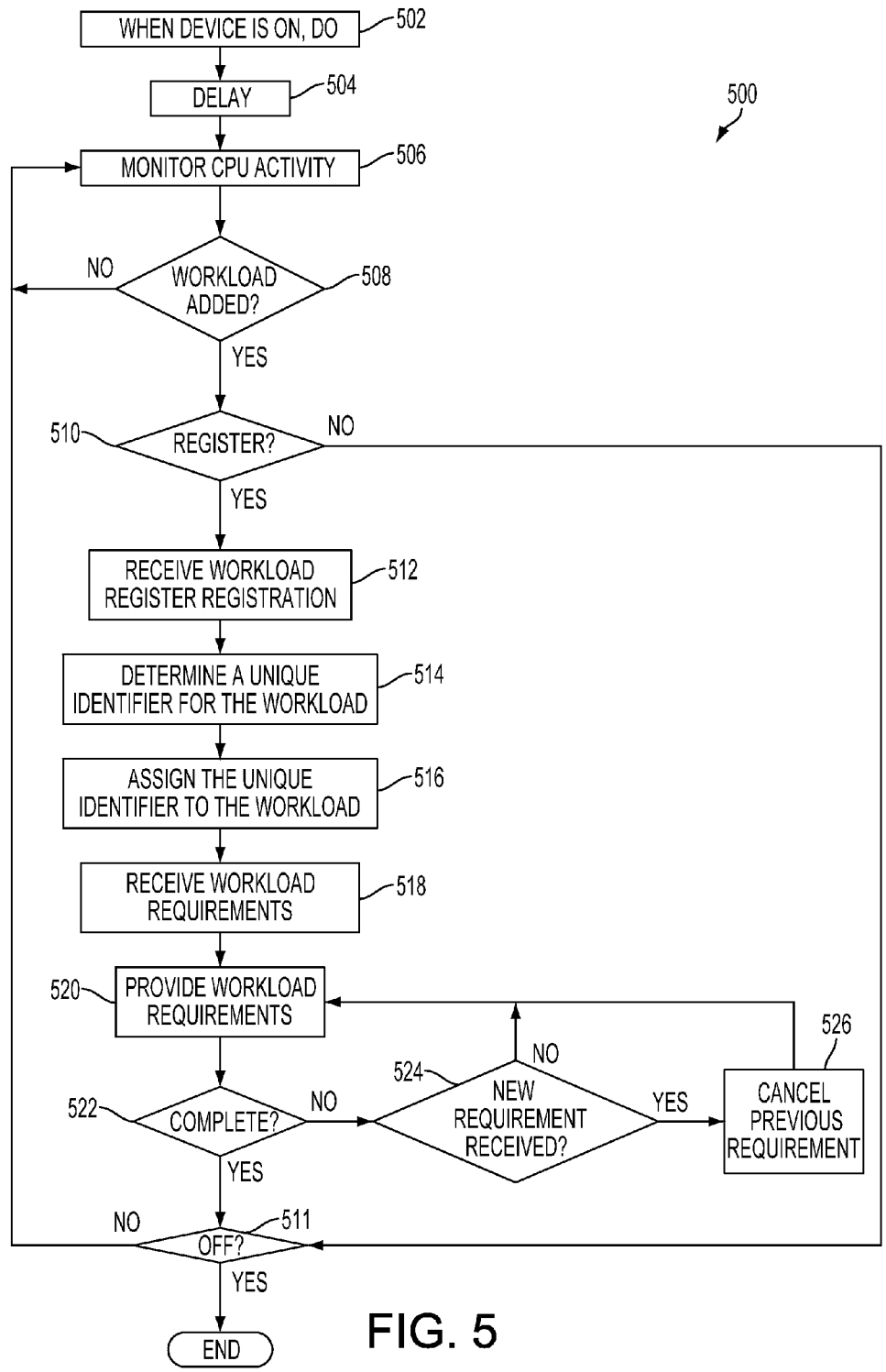
FIG. 5 is a flowchart illustrating a method of registering workloads.

Referring to FIG. 5, a method of registering workloads is shown and is generally designated 500. The method 500 begins at block 502 with a do loop in which when a device is powered on, the following steps may be performed. At block 504, a delay may be implemented by a controller. The delay may be a fixed, predetermined time period, e.g., sixty seconds (60 s). Alternatively, the delay may conclude after an explicit event, e.g., a boot completion. Moving to block 506, the controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 508, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

In a particular aspect, if a workload is not added at decision 508, the method 500 may return to block 506 and the method 500 may continue as described herein. Otherwise, at decision 508, if a workload is added, the method 500 may continue to decision 510, and the controller may determine whether the workload is registering with the controller. If the workload is not registering, the method 500 may proceed to decision 511. At decision 511, the controller may determine whether the device is powered off. If so, the method 500 may end. Otherwise, if the device remains powered on, the method 500 may return to block 506 and the controller may continue monitoring CPU activity until it determines that another workload is added at decision 508.

Returning to decision 510, if the workload is registering with the controller, the method 500 may proceed to block 512 and the controller may receive a workload registration. At block 514, the controller may determine a unique identifier for with the workload. Next, at block 516, the controller may assign the unique identifier to the workload.

Proceeding to block 518, the controller may receive the workload requirements. The workload requirements, for example, may include a required responsivity. The responsivity may be a rate of change of a system setting. For example, the responsivity may be a rate of change of a CPU frequency, a rate of change of a voltage, or a combination thereof. Further, the responsivity may be a maximum delay as expressed in milliseconds, a CPU slew rate bound as expressed frequency per milliseconds (MHz/ms), or a combination thereof.

Moving to block 520, the workload requirement, or requirements, may be provided by the controller, i.e., the controller may instruct a dynamic clock and voltage scaling (DCVS) algorithm to provide the responsivity indicated in the workload. Thereafter, the method 500 may proceed to decision 522. At decision 522, the controller may determine whether the workload is complete, i.e., no longer running. If the workload is not complete, i.e., still running, the method 500 may proceed to decision 524 and the controller may determine whether a new workload requirement is received. If so, the method 500 may move to block 526 and the controller may cancel the previous workload requirement. Then, the method 500 may return to block 520 and the method 500 may continue as described.

Returning to decision 524, if a new workload requirement is not received, the method 500 may return to block 520 and continue as described. Returning to decision 522, if the workload is complete, the method 500 may move to decision 511 and the method 500 may continue as described herein.

Figure 6:
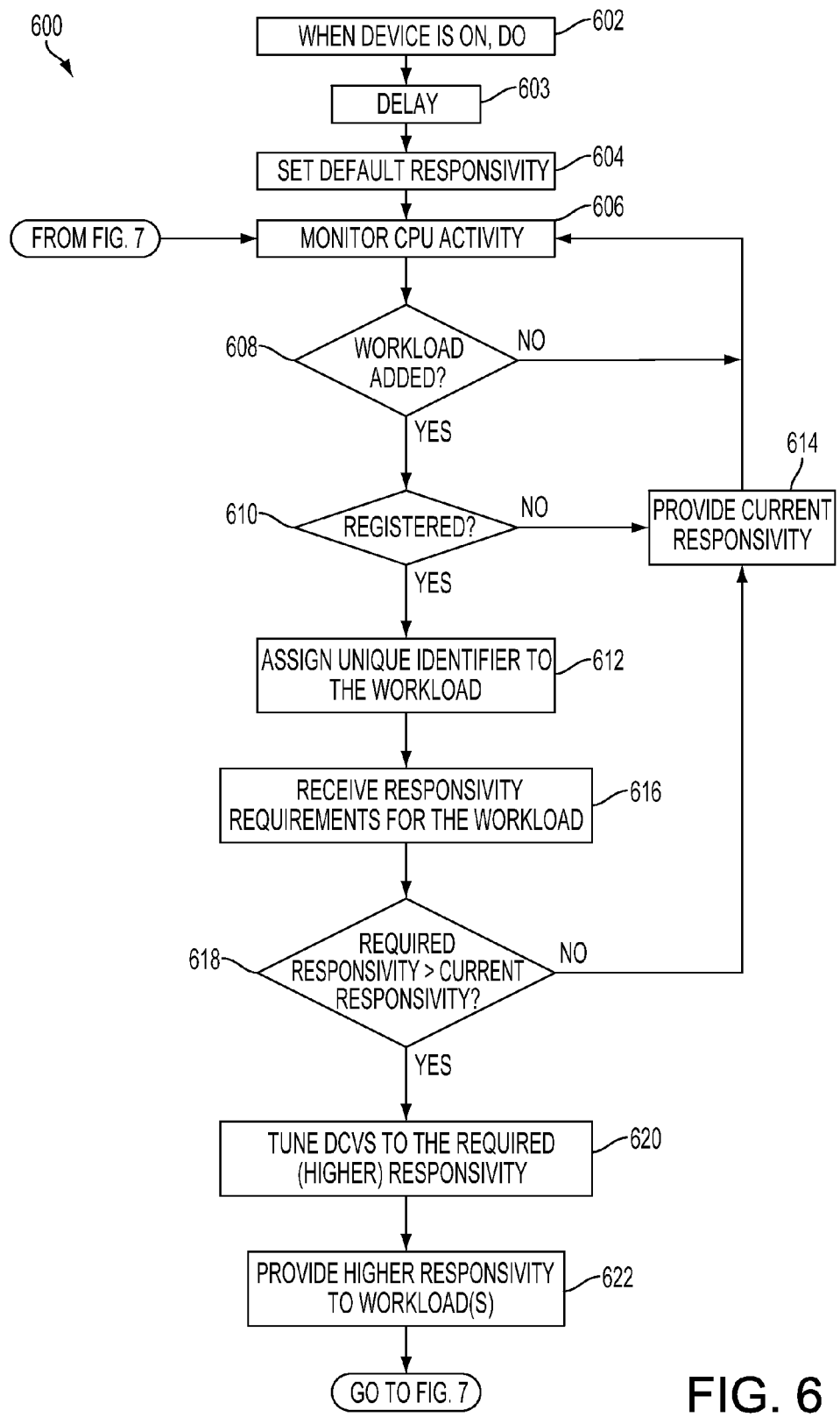
FIG. 6 is a flowchart illustrating a first portion of a method of tuning a dynamic clock and voltage switching algorithm based on workload requests.

Referring to FIG. 6, a method of turning a dynamic clock and voltage switching algorithm based on workload requests is shown and is generally designated 600. The method 600 begins at block 602 with a do loop in which when a device is powered on, the following steps may be performed. At block 603, a delay may be implemented by a controller. The delay may be a fixed, predetermined time period, e.g., sixty seconds (60 s). Alternatively, the delay may conclude after an explicit event, e.g., a boot completion.

At block 604, a controller may set a default responsivity, e.g., a default frequency, a default voltage, or a combination thereof. Moving to block 606, the controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

At decision 608, the controller may determine if a workload is added. The workload may be a video application, an audio application, an email application, a wireless network application, a cellular network application, a short message service (SMS) application, a communication application, a security application, a calendar application, an instant messaging application, a still camera application, a global positioning system (GPS) application, a browser application, a memo pad application, a clock application, a game application, a calculator application, a banking application, a password keeper application, a help application, an ecommerce application, a software delivery application, a search application, an options application, a setup application, a telephone application, a connection management application, a security application, any other application, or a combination thereof.

At decision 608, if a workload is not added, the method 600 may return to block 606 and the method 600 may continue as described herein. Conversely, at decision 608, if a workload is added, the method 600 may proceed to decision 610 and the controller may determine whether the workload has registered. At decision 610, if the workload is not registered, the method 600 may proceed to block 614 and the controller may provide the current responsivity to the workload. On a first iteration of the method 600, the current responsivity may be the default responsivity. Upon subsequent iterations, the current responsivity may be a required responsivity associated with another registered workload if that required responsivity is greater than the default responsivity.

Returning to decision 610, if the workload has registered with the controller, the method 600 may proceed to block 612 and the controller may assign a unique identifier to the workload. Then, at block 616 and the controller may receive the responsivity requirements for the workload directly from the workload.

Alternatively, when the workload contacts the controller, the workload may submit a unique identifier to the controller. Then, the controller may use the unique identifier to determine whether the workload is registered with the controller, or some related control system. For example, the controller may search a table or database with the unique identifier and if the controller locates a matching unique identifier on in the table or database the workload may be considered registered. If the workload is registered, the controller may determine the responsivity requirements from the table or database, i.e., the responsivity requirements may be stored in the table or database in association with the unique identifier.

Figure 7:
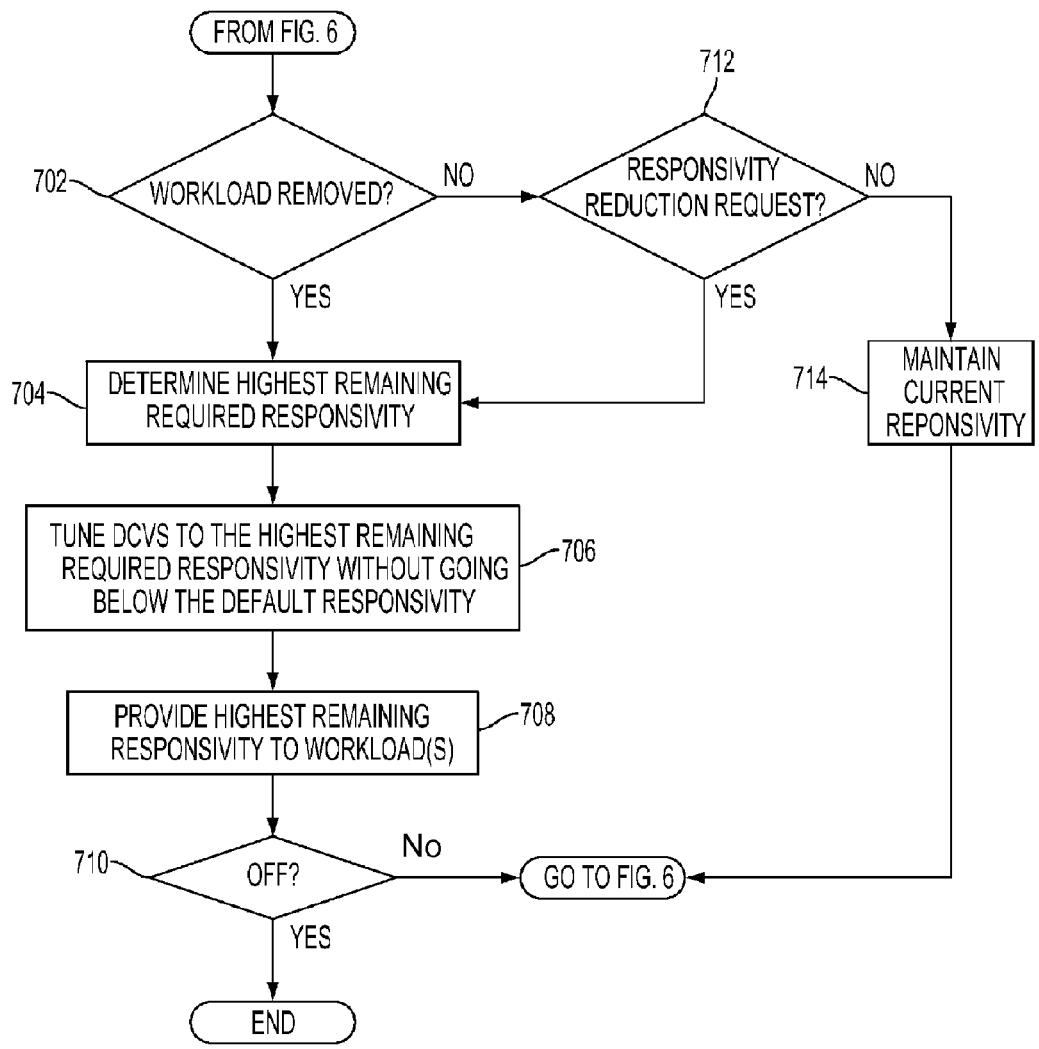
FIG. 7 is a flowchart illustrating a second portion of a method of tuning a dynamic clock and voltage switching algorithm based on workload requests.

Proceeding to decision 618, the controller may determine whether the required responsivity is greater than the current responsivity. If the required responsivity is not greater than the current responsivity the method 600 may return to block 614 and the controller may provide the current responsivity to the registered workload. Otherwise, if the required responsivity is greater than the current responsivity, the method 600 may continue to block 620 and the controller may tune the dynamic clock and voltage scaling (DCVS) algorithm to the required, i.e., higher, responsivity. Thereafter, at block 622, the controller may provide the higher responsivity to workload. From block 622, the method 600 may proceed to decision 702 of FIG. 7.

At decision 702, the controller may determine whether the workload is removed, i.e., has the workload been completed or otherwise terminated. If the workload is removed, the method 600 may proceed to block 704 and the controller may determine a highest remaining required responsivity. In the case that there are no longer any require responsivities from any workloads, the highest remaining responsivity will be the default responsivity.

At block 706, the controller may tune the DCVS to the highest remaining required responsivity without going below the default responsivity. Then, at block 708, the controller may provide the highest remaining responsivity to the workload, or workloads.

Moving to decision 710, the controller may determine whether the device is powered off. If the device is not powered off, the method 600 may return to block 606 of FIG. 6 and the method 600 may continue as described herein. Alternatively, at decision 710, if the device is powered off, the method 600 may end.

Returning to decision 702, if the workload is not removed, the method 600 may proceed to decision 712 and the controller may determine whether a responsivity reduction request is received from the workload associated with the current responsivity. If so, the method 600 may move to block 704 and the method 600 may continue as described. Otherwise, the method may move to block 714 and the controller may maintain the current responsivity. Then, the method 600 may return to block 606 of FIG. 6 and continue as described herein.

Figure 8:
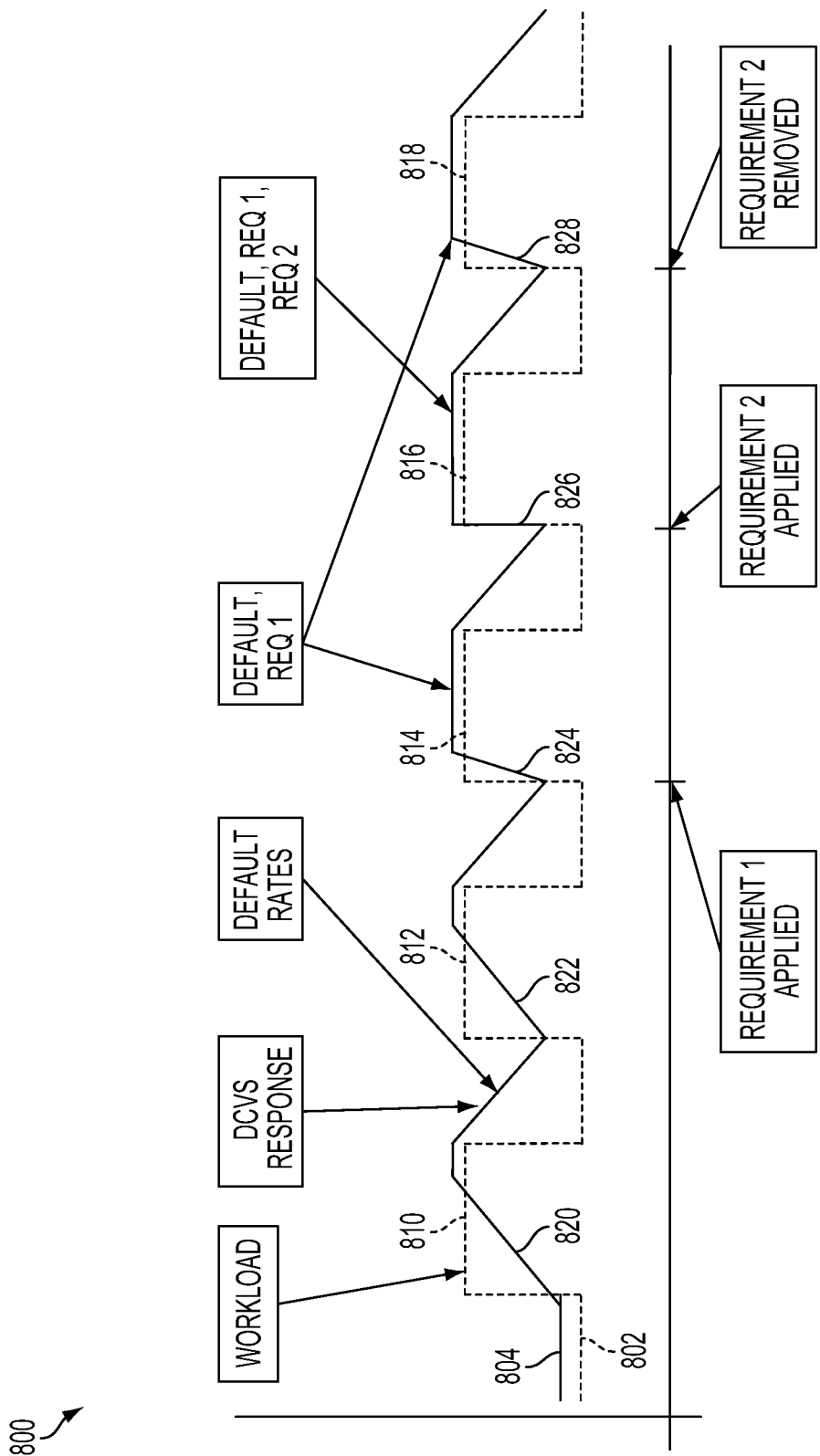
FIG. 8 is a graph illustrating a workload and a dynamic clock and voltage scaling algorithm responsivity for a central processing unit plotted versus time.

Referring to FIG. 8, a workload/DCVS response graph is shown and is generally designated 800. As shown, the workload/DCVS response graph 800 includes a workload indicator 802, and a DCVS response indicator 804. The workload indicator 802 may include a first busy cycle 810, a second busy cycle 812, a third busy cycle 814, a fourth busy cycle 816, and a fifth busy cycle 818. Further, the DCVS response indicator 804 may include a first DCVS response 820, a second DCVS response 822, a third DCVS response 824, a fourth DCVS response 826, and a fifth DCVS response 828.

In a particular aspect, the first DCVS response 820 corresponds to the first busy cycle 810, the second DCVS response 822 corresponds to the second busy cycle 812, the third DCVS response 824 corresponds to the third busy cycle 814, the fourth DCVS response 826 corresponds to the fourth busy cycle 816, and the fifth DCVS response 828 corresponds to the fifth busy cycle 818.

During the first busy cycle 810 and the second busy cycle 812, the workload, or workloads, may be unregistered. As such, the first DCVS response 820 and the second DCVS response 822 may be a default response, e.g., a default rate of change of the CPU frequency, a default rate of change of voltage, or a combination thereof. During the third busy cycle 814, an unregistered workload and a first registered workload may be performed. The requirements of the first registered workload may be greater than the default rate. Accordingly, at the start of the third busy cycle 814, the requirement of the first registered workload may be applied and the third DCVS response 824 may provide the requirement of the first registered workload. Therefore, third DCVS response 824 provides the requirement for the unregistered workload and the first registered workload.

During the fourth busy cycle 816, an unregistered workload, a first registered workload, and a second registered workload may be performed. The requirements of the second registered workload may be greater than the default rate and the requirement of the first registered workload. Accordingly, at the start of the fourth busy cycle 816, the requirement of the second registered workload may be applied and the fourth DCVS response 826 may provide the requirement of the second registered workload. Therefore, fourth DCVS response 826 also provides the requirement for the unregistered workload and the first registered workload.

During the fifth busy cycle 818, the second registered workload may be removed from the fifth busy cycle 818 and an unregistered workload and the first registered workload may be present. As such, at the start of the fifth busy cycle 818, the requirement of the second registered workload may be removed from the fifth DCVS response 828 and the fifth DCVS response may provide the requirement of the first registered workload which has not been removed from the fifth busy cycle 818. Accordingly, at the start of the fifth busy cycle 818, the requirement of the first registered workload may be applied and the fifth DCVS response 828 may provide the requirement of the first registered workload. Therefore, fifth DCVS response 828 may provide the requirement for the unregistered workload and the first registered workload.

It may be appreciated that any changes in responsivity may also affect the DCVS response at the trailing edge of workloads, e.g., as the workloads cease.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof. Further, the method steps described herein may be executed on a single core processor, a multicore processor, multiple single core processors, multiple multicore processors, or any combination thereof.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of performing a dynamic clock and voltage switching (DCVS) algorithm on a portable computing device, the method comprising:
    setting a current responsivity of a processor of the portable computing device equal to a default responsivity value;
    executing an unregistered workload in the processor;
    monitoring processor activity to determine when a new workload is added to the processor;
    determining whether the added workload is registered;
    assigning a unique identifier to the added workload when it is determined that the added workload is registered;
    receiving a required responsivity value from the added workload;
    determining whether the required responsivity value is greater than the current responsivity of the processor;
    setting the current responsivity of the processor equal to the required responsivity value received from the added workload in response to determining that the required responsivity value is greater than the current responsivity of the processor;
    adjusting at least one of a frequency and a voltage of the processor based on the current responsivity of the processor; and
    executing the unregistered workload and the registered workload at the adjusted frequency or voltage when it is determined that the added workload is registered.

2. The method of claim 1, wherein setting the current responsivity of the processor equal to the default responsivity value comprises setting a rate of change for adjusting at least one of the frequency and voltage of the processor equal to the default responsivity value.

3. The method of claim 1, further comprising:
    adjusting at least one of the frequency and voltage of the processor based on the current responsivity for a plurality of workloads of the portable computing device in response to determining that the required responsivity is not greater than the current responsivity of the processor.

4. The method of claim 1, further comprising:
    setting the current responsivity of each of a plurality of processors of the portable computing device equal to the required responsivity value for a plurality of workloads of the portable computing device.

5. A portable computing device, comprising:
    means for setting a current responsivity of a processor of the portable computing device equal to a default responsivity value;
    means for executing an unregistered workload in the processor;
    means for monitoring processor activity to determine when a new workload is added to the processor;
    means for determining whether the added workload is registered;
    means for assigning a unique identifier to the added workload when it is determined that the added workload is registered;
    means for receiving a required responsivity value from the added workload;
    means for determining whether the required responsivity value is greater than the current responsivity of the processor;
    means for setting the current responsivity of the processor equal to the required responsivity value received from the added workload in response to determining that the required responsivity value is greater than the current responsivity of the processor;
    means for adjusting at least one of a frequency and a voltage of the processor based on the current responsivity of the processor; and
    means for executing the unregistered workload and the registered workload at the adjusted frequency or voltage when it is determined that the added workload is registered.

6. The portable computing device of claim 5, wherein means for setting the current responsivity of the processor equal to the default responsivity value comprises means for setting a rate of change for adjusting at least one of the frequency or voltage of the processor equal to the default responsivity value.

7. The device of claim 5, further comprising:
    means for providing a current responsivity to all workloads when the required responsivity is not greater than the current responsivity.

8. The portable computing device of claim 5, further comprising:
    means for setting the current responsivity of each of a plurality of processors of the portable computing device equal to the required responsivity value for a plurality of workloads of the portable computing device.

9. A portable computing device, comprising:
    a processor configured with processor executable instructions to perform operations comprising:
        setting a current responsivity of a processor of the portable computing device equal to a default responsivity value;
        executing an unregistered workload in the processor;
        monitoring processor activity to determine when a new workload is added to the processor;
        determining whether the added workload is registered;
        assigning a unique identifier to the added workload when it is determined that the added workload is registered;
        receiving a required responsivity value from the added workload;
        determining whether the required responsivity value is greater than the current responsivity of the processor;
        setting the current responsivity of the processor equal to the required responsivity value received from the added workload in response to determining that the required responsivity value is greater than the current responsivity of the processor;
        adjusting at least one of a frequency and a voltage of the processor based on the current responsivity of the processor; and
        executing the unregistered workload and the registered workload at the adjusted frequency or voltage when it is determined that the added workload is registered.

10. The portable computing device of claim 9, wherein the portable device processor is configured with processor-executable instructions such that setting the current responsivity of the processor equal to the default responsivity value comprises setting a rate of change for adjusting the at least one of the frequency and voltage of the processor equal to the default responsivity value.

11. The portable computing device of claim 9, wherein the portable device processor is configured with processor-executable instructions to perform operations further comprising:

adjusting at least one of the frequency and voltage of the processor based on the current responsivity for a plurality of workloads of the portable computing device in response to determining that the required responsivity is not greater than the current responsivity.

12. The portable computing device of claim 9, wherein the portable device processor configured with processor-executable instructions to perform operations further comprising:

setting the current responsivity of each of a plurality of processors of the portable computing device equal to the required responsivity value for a plurality of workloads of the portable computing device.

13. A non-transitory computer-readable storage medium having stored thereon processor executable instructions configured to cause a portable device processor to perform operations comprising:

setting a current responsivity of a processor equal to a default responsivity value;
executing an unregistered workload in the processor;
monitoring processor activity to determine when a new workload is added to the processor;
determining whether the added workload is registered;
assigning a unique identifier to the added workload when it is determined that the added workload is registered;
receiving a required responsivity value from the added workload;
determining whether the required responsivity value is greater than the current responsivity of the processor;
setting the current responsivity of the processor equal to the required responsivity value received from the added workload in response to determining that the required responsivity value is greater than the current responsivity;
adjusting at least one of a frequency and a voltage of the processor based on the current responsivity; and
executing the unregistered workload and the registered workload at the adjusted frequency or voltage when it is determined that the added workload is registered.

14. The non-transitory computer-readable storage medium of claim 13, wherein the stored processor-executable instructions are configured to cause the portable device processor to perform operations such that setting the current responsivity of the processor equal to the default responsivity value comprises setting a rate of change for adjusting the frequency or voltage of the processor equal to the default responsivity value.

15. The non-transitory computer-readable storage medium of claim 13, wherein the stored processor-executable instructions are configured to cause the portable device processor to perform operations further comprising:

adjusting at least one of the frequency and voltage of the processor based on the current responsivity for a plurality of workloads in response to determining that the required responsivity is not greater than the current responsivity.

16. The non-transitory computer-readable storage medium of claim 13, wherein the stored processor-executable instructions are configured to cause the portable device processor to perform operations further comprising:

setting the current responsivity of each of a plurality of processors equal to the required responsivity value for a plurality of workloads.

\* \* \* \* \*